(12) United States Patent
Isunza Rebolledo

(10) Patent No.: US 10,557,077 B2
(45) Date of Patent: Feb. 11, 2020

(54) OIL-BASED COMPOSITIONS FOR DISPERSING ASPHALTENES AND PARAFFINS

(71) Applicant: Itzeder Alejandro Isunza Rebolledo, México (MX)

(72) Inventor: Itzeder Alejandro Isunza Rebolledo, México (MX)

( * ) Notice: Subject to any disclaimer, the term of this patent is extended or adjusted under 35 U.S.C. 154(b) by 0 days.

(21) Appl. No.: 15/314,384

(22) PCT Filed: May 26, 2015

(86) PCT No.: PCT/IB2015/053927
§ 371 (c)(1),
(2) Date: Feb. 24, 2017

(87) PCT Pub. No.: WO2015/181719
PCT Pub. Date: Dec. 3, 2015

(65) Prior Publication Data
US 2017/0198193 A1 Jul. 13, 2017

(30) Foreign Application Priority Data
May 26, 2014 (MX) .................. MX/a/2014/006332

(51) Int. Cl.
*C09K 8/524* (2006.01)

(52) U.S. Cl.
CPC .......... *C09K 8/524* (2013.01); *C09K 2208/10* (2013.01)

(58) Field of Classification Search
CPC ............... C09K 2208/10; C09K 8/805; C09K 2208/32; C09K 8/40; C09K 8/50; C09K 8/516; C09K 8/52; C09K 8/524; C09K 8/565; C09K 8/572; C09K 8/64; C09K 8/665; C09K 8/68; C09K 21/02; C09K 2208/08; C09K 2208/12; C09K 2208/20; C09K 2208/22; C09K 2208/26; C09K 2208/28; C09K 5/063; C09K 5/066; C09K 8/03; C09K 8/10; C09K 8/42; C09K 8/467; C09K 8/528; C09K 8/536; C09K 8/56; C09K 8/588; C09K 8/60; C09K 8/605; C09K 8/62; C09K 8/72; C09K 8/74
See application file for complete search history.

(56) References Cited

U.S. PATENT DOCUMENTS

| | | | | |
|---|---|---|---|---|
| 4,864,064 A * | 9/1989 | Hagel | .................. | C07C 409/16 568/558 |
| 6,090,769 A | 7/2000 | Vlasblom | | |
| 7,713,314 B2 * | 5/2010 | Jones | ..................... | C10L 1/003 431/288 |
| 2004/0224854 A1 * | 11/2004 | Boudreau | ................ | C09K 3/32 507/218 |
| 2009/0286702 A1 * | 11/2009 | Huang | ..................... | C09K 8/44 507/260 |
| 2010/0096139 A1 * | 4/2010 | Holcomb | ............... | C09K 8/536 166/308.1 |
| 2012/0015852 A1 * | 1/2012 | Quintero | ................ | C09K 8/032 507/112 |
| 2013/0126798 A1 | 5/2013 | Nakatani | | |
| 2014/0332212 A1 * | 11/2014 | Ayers | ..................... | C09K 8/584 166/279 |

FOREIGN PATENT DOCUMENTS

| | | |
|---|---|---|
| WO | 2005014051 A1 | 2/2005 |
| WO | 2011062799 A2 | 5/2011 |
| WO | 2012009128 A2 | 1/2012 |
| WO | 2012129302 A2 | 9/2012 |
| WO | 2012170569 A1 | 12/2012 |

OTHER PUBLICATIONS

P. Moriarty, Nanostructured materials, Rep. Prog. Phys. 64 (2001) 297-381.*

* cited by examiner

*Primary Examiner* — Kumar R Bhushan
(74) *Attorney, Agent, or Firm* — Browdy and Neimark, PLLC

(57) ABSTRACT

Oil-based compositions for dispersing asphaltenes and paraffins in ducts and equipment employed in the field of oil production, transporting, processing and storing are provided. The compositions are easy to formulate and they further are environmentally friendly as they are biodegradable and "green" products. The compositions comprise a non-polar solvent and bismuth nanoparticles, and can optionally further comprise a compound in the terpenes or terpenoids family and an organic acid.

26 Claims, 3 Drawing Sheets

OIL-BASED COMPOSITIONS FOR DISPERSING ASPHALTENES AND PARAFFINS

TECHNICAL FIELD

The present invention relates to the field of oil extraction, and more particularly, the invention relates to oil based compositions for dispersing asphaltenes and paraffins.

BACKGROUND OF THE INVENTION

Generally, oil heavy fractions contain paraffins and asphaltenes that tend to crystallize under cooling and/or a change in operation conditions in oil fractions which contain them. A drawback of the presence of paraffins and asphaltenes in oil fractions is that they sediment in pipings, thereby clogging the hydrocarbon production flow. These sediments have to be removed from the production lines, containers and equipment employed in oil production in order to maintain process efficiency.

To this end, sulfur trioxide is usually employed to form a dispersible material with the paraffin and to remove it with an aqueous liquid and a surfactant. Solvents and dispersing agents such as a primary alcohol and ethylene oxide co-polymers with sodium silicate and succinamide N-substituted ethers may also be used. Likewise, several compositions aimed to achieve this object have been developed.

For example, U.S. Pat. No. 6,090,769 relates to asphalt and heavy oils degreaser comprising a cyclic hydrocarbon solvent, dipropylene glycol mono n-butyl ether, a volatility stabilizer, an aromatic alkyl sulfonic acid salt, a branched ethoxylated alcohol and ethoxylated alkyl mercaptane. Said degreaser has suitable solvent and detergent properties. To that end, the volatility stabilizer synergically acts with the cyclic hydrocarbon solvent and dipropylene glycol mono n-butyl ether.

Document WO 2011/062799 provides a method of removing depositions from oil deposits, involving heating the sediment and/or contacting it with the reaction product from an exothermic reaction of a solvent with an acid. Nonetheless, this method has the drawback of using corrosive substances which can affect the duct materials, along with the requirement of including an additional method in the crude oil production process.

On the other hand, documents WO 2012/009128 A2 and WO 2012/129302 A2 provide compositions with nanomaterials being used as drilling fluids. The compositions have improved properties such as wettability, friction reduction, corrosion resistance and rheological properties compared to other existing fluids. These compositions modify the physical properties of asphaltene such that they prevent it from adhering to the drilling bit surfaces during the well drilling operation. The compositions described in both documents are formulated on an aqueous base or as an emulsion and further comprise nanoparticles of metal oxides, graphite or graphene. Nonetheless, these compositions have the drawback of using a laborious formulation process and being non-degradable.

In view of the above, there is a need to provide alternate compositions allowing suitable dispersing of paraffins and asphaltenes, being easy to formulate and environmentally friendly.

OBJECTS OF THE INVENTION

Considering the drawbacks of the prior art, it is an object of the present invention to provide oil based compositions for dispersing asphaltenes and paraffins in ducts and equipment employed in the field of oil production.

It is a further object of the present invention to improve the yield of an oil well.

It is a still another object of the present invention to improve the crude oil transportation yield through a duct.

Likewise, it is a further object of the present invention to improve the yield of the turbo-machinery in contact with the crude oil.

It is still another object of the present invention to improve the rheological properties of a heavy crude oil.

It is also an object of the present invention to have a composition which, due to its high ignition point, is safer in its application, thus avoiding accidents.

It is also an object of the present invention to provide a composition for the cleaning of storage tanks and crude oil processing plants.

It is still a further object of the present invention to develop a biodegradable and "green" product to achieve the above objects.

DETAILED DESCRIPTION OF THE INVENTION

Figure 1:
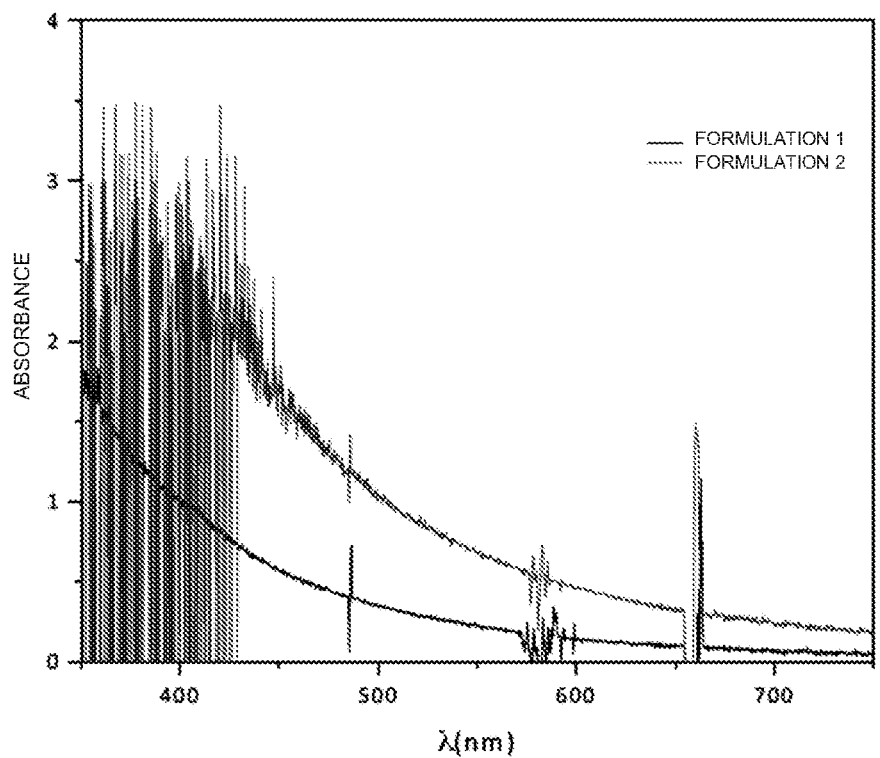
FIG. 1 is a comparative UV-VIS spectrum between a composition comprising bismuth nanoparticles according to an embodiment of the present invention and another composition lacking said nanoparticles.

It has been surprisingly found that an oil based composition combined with metal nanoparticles is highly efficient for dispersing paraffins and asphaltenes in ducts and equipment used in oil production, thereby improving the yield of an oil well in a secure and environmentally friendly manner, as it is a biodegradable and green product.

Thus, in one aspect of the invention, a composition comprising a non-polar solvent as the oil-base and bismuth nanoparticles is described.

In an embodiment of the present invention, the composition further comprises a compound of the terpenes or terpenoids family and an organic acid.

Preferably, the non-polar solvent is a fatty acid methyl ester, which is selected from the group comprising corn oil methyl ester, rapeseed oil methyl ester, oleic acid methyl ester, fatty-acids medium and large size chain-triglyceride methyl esters, and mixtures thereof. More preferably, the non-polar solvent is corn oil methyl ester.

The non-polar solvent is present in the composition in a range from 10 to 99.99 wt % of the composition, preferably from 90 to 99 wt % of the composition, even more preferably from 95 to 99 wt % of the composition.

To the effects of the present invention, the term nanoparticle refers to a nanodust, nanowire, nanolines, nanotubes or any bismuth nanostructure. The bismuth nanoparticles are selected from the group comprising metal bismuth, bismuth oxide, bismuth sulfur, bismuth carbonate, and mixtures thereof. More preferably, the bismuth nanoparticles are metal bismuth, bismuth oxide, bismuth sulfur, and mixtures thereof.

The bismuth nanoparticles have a particle size in the range from 5 nm to 200 nm, preferably between 20 nm and 100 nm.

Likewise, said nanoparticles are present in the composition in a range from 0.01 to 10 wt % of the composition, preferably from 0.01 to 1.0 wt % of the composition.

Optionally, these bismuth nanoparticles can also be modified or functionalized at their surface with functional groups selected from saturated or unsaturated straight, branched, cyclic $C_1$-$C_{20}$ carboxylic acids, salts thereof and combinations thereof; amides, amines, triglycerides, polymers, and salts thereof; aldehydes, ketones; anionic, cationic, zwitterionic and non-ionic surfactants; mercapto groups, thiols, ethers, terpenes, terpenoids; essential oils; and combinations thereof; and saturated or unsaturated straight, branched and cyclic sulfonated acids, salts thereof and combinations thereof.

Regarding the compound in the terpene or terpenoid family, this is selected from the group comprising monoterpenes, sesquiterpenes, biterpenes, triterpenes, tetraterpenes, polyterpenes, and mixtures thereof. Preferably, the compound in the terpene or terpenoid family is selected from the group comprising menthol, pinene, camphor, geraniol, D-limonene, L-limonene, dipentene, myrcene, terpinene, squalene, carotene, orange terpenes, cinnamic aldehyde and long chain aldehydes, and mixtures thereof. More preferably, the compound in the terpene or terpenoid family is D-limonene, orange terpenes, cinnamic aldehyde, long chain aldehydes, and mixtures thereof.

The compound in the terpene or terpenoid family is present in the composition in a range from 0 to 50 wt % of the composition, preferably from 0.5 to 10 wt % of the composition, more preferably from 0.5 to 5 wt % of the composition.

Regarding the organic acid, this is selected from the group comprising sulfonic acids and salts thereof; carboxylic acids and salts thereof; sulfonated acids; and mixtures thereof. Preferably the organic acid is selected from the group comprising dodecilbenzenesulfonic acid, $C_6$-$C_{18}$ sulfonated acids and mixtures thereof; more preferably, the organic acid is dodecilbenzenesulfonic acid.

The organic acid is present in the composition in a range from 0 to 20 wt % of the composition, preferably from 0.5 to 10 wt % of the composition, more preferably from 0.5 to 5 wt % of the composition.

The composition of the present invention can optionally comprise surfactants selected from the group comprising non-ionic surfactants, anionic surfactants, cationic surfactants, amphoteric surfactants, and mixtures thereof. Non-ionic surfactants are selected from the group comprising alkyl polyglucosides, sorbitan esters, methyl glucoside esters, ethoxylated amines, ethoxylated diamines, polyglycerol esters, polysorbates, and alkyl ethoxylates. As suitable anionic surfactants are included those selected from the group comprising alkyl ether sulfonates, docusates, alkyl benzene sulfonates, alkyl sulfonates, alkyl aryl sulfonates, straight or branched alkyl ether sulfates, straight or branched alkyl ether sulfonates, polypropoxylated alcohol sulfates, alkyl bisulfonates, alkyl bisulfates, and mixtures thereof. Cationic surfactants are selected from the group comprising methyl arginine esters, alkanolamines, alkylenediamines, alkyl trimethyl ammonium salts, and mixtures thereof. The surfactant is selected preferably from polysorbates; more preferably polyoxyethylene(20) sorbitanmonooleate (also known as polysorbate 80).

If it is preferred that the composition of the present invention is oil-based, in another embodiment of the present invention, the composition may also be formulated as an oil/water or water/oil emulsion.

The composition of the present invention in any of its embodiments is used for dispersing asphaltenes, paraffins and crude oil heavy organic fractions, by modifying its rheological properties.

EXAMPLE 1

Preparation of Compositions with Bismuth Nanoparticles

In order to carry out different experimental assays showing the improved dispersion of asphaltenes and paraffins using the compositions comprising bismuth nanoparticles according to the principles of the present invention in Examples 3 to 8, the preparation of several oil based composition was carried out with bismuth nanoparticles.

In this example the general methodology to prepare said compositions comprising bismuth nanoparticles is described, particularly β-$Bi_2O_3$ nanoparticles.

To prepare the compositions comprising β-$Bi_2O_3$ nanoparticles according to specific embodiments of the present invention, a determined amount of β-$Bi_2O_3$ nanoparticles is added to different oil based compositions of interest, and then the nanoparticles are dispersed using ultrasound with a Misonix S-4000 ultrasound processor having a ½" sonicator horn at an amplitude of 80, for 2 minutes, in a cooling bath.

The determined amount of β-$Bi_2O_3$ nanoparticles as well as the ingredients and specific amounts used in each composition prepared is detailed in the description of each Example 3 to 8.

EXAMPLE 2

Methodology for the Measurement of the Asphaltenes and Paraffins Dispersion Caused by a Composition with β-$Bi_2O_3$ Nanoparticles The present experimental methodology has the purpose of assessing the improved dispersion ability of asphaltenes and paraffins in a composition to which β-$Bi_2O_3$ nanoparticles have been added according to the present invention as described in Example 1. In order to describe the methodology, the original composition without β-$Bi_2O_3$ nanoparticles will be referred to as the "original composition", and the composition containing β-$Bi_2O_3$ nanoparticles will be referred to as the "modified composition".

The methodology is as follows:
1) Weighing about 0.3 g of an asphaltenes and paraffins sample taken from a production rig.
2) Taking note of the sample weight.

3) The sample is placed in a coffee filter and it is sealed at the top with an elastic band.
4) The total weight of the filter having the sample is registered.
5) 10 mL of the modified composition are poured in a 40 mL vial.
6) The modified composition is heated at 60° C. with a magnetic stirrer.
7) When the modified composition is at 60° C., the filter with the sample is immersed.
8) The filter with the sample is immersed during 20 minutes with the stirrer on, after this time has elapsed, the modified composition must turn dark.
9) Once the 20 minutes have passed the filter with the sample is removed from the modified composition and left draining.
10) The spectrophotometer is calibrated with a solution of the original composition in isopropyl alcohol. To prepare this solution, 0.5 mL from the original composition are taken and added to 5 mL of isopropyl alcohol (spectrophotometer target).
11) A solution is prepared with 0.5 mL of the modified composition, wherein the filter had been immersed with the sample, and 5 mL of isopropyl alcohol.
12) From the solution prepared in item 11, the UV-VIS absorption reading is taken in a wavelength range ($\lambda$) from 350 to 750 nm. According to the article "Interfacial and colloidal behavior of asphaltenes obtained from Brazilian crude oils." Silva Ramos, Antonio Carlos et al. Journal of Petroleum Science and Engineering, 32 (2001) 201-216; absorbance at 400 nm is assumed as representative to measure the concentration of asphaltenes fractions in crude oil, wherein the increase in absorbance is proportional to the increase in asphaltene concentration. In this sense, the absorbance increase at a wavelength of 400 nm will indicate a higher dispersion of asphaltenes and paraffins.
13) If in the above step 12 is determined that the dispersed amount of asphaltenes and paraffins is too high (absorbances above 2), a dilution may be carried out wherein 0.1 mL of the modified composition, where the filter with the sample had been immersed into, are taken and dissolved in 9.9 mL of isopropyl alcohol in order to obtain clearer readings.
14) The UV-VIS absorption measure is carried out again in a wavelength range ($\lambda$) from 350 to 750 nm.
15) With the information obtained, absorbance comparative graphs are plotted.

EXAMPLE 3

Absorbance Comparison in Corn Oil Methyl Ester Based Compositions

In this example, the absorbance measurements are compared in two compositions. One composition comprises only corn oil methyl ester (Formulation 1), while the other composition according to the present invention comprises corn oil methyl ester and $\beta$-$Bi_2O_3$ nanoparticles (Formulation 2). $\beta$-$Bi_2O_3$ nanoparticles were dispersed in Formulation 2 according to the methodology of the Example 1. The results obtained by the methodology described in Example 2 allow the comparison of the dispersion potential of the $\beta$-$Bi_2O_3$ nanoparticles.
Formulation 1.

| Compound | Amount (g) |
|---|---|
| Corn oil methyl ester | 100 |

Formulation 2.

| Compound | Amount (g) |
|---|---|
| Corn oil methyl ester | 99.9999 |
| $\beta$-$Bi_2O_3$ | 0.0001 |

FIG. 1 shows a comparison between absorbances of Formulation 1 and Formulation 2 in a wavelength range ($\lambda$) from 350 to 750 nm. It can be noted that at the 400 nm wavelength, there is a clear increase in absorbance for Formulation 2, which indicates a rise in the asphaltenes and paraffins concentrations due to their dispersion caused by the presence of the $\beta$-$Bi_2O_3$ nanoparticles according to the principles of the present invention.

EXAMPLE 4

Absorbance Comparison in Corn Oil Methyl Ester-Based Compositions with Dodecilbenzenesulfonic Acid and D-Limonene In this example, the absorbance values from two compositions are also compared similarly to Example 3. Formulations 3 and 4 are now prepared with additional ingredients to Formulations 1 and 2, as can be seen below. Formulation 4 comprises the same ingredients as Formulation 3, and in addition, $\beta$-$Bi_2O_3$ nanoparticles to compare asphaltenes dispersion in both formulations. $\beta$-$Bi_2O_3$ nanoparticles were dispersed in Formulation 4 according to the methodology of example 1 and the absorbance measurement is carried out with the methodology described in example 2.
Formulation 3.

| Compound | Amount (g) |
|---|---|
| Corn oil methyl ester | 98 |
| dodecilbenzenesulfonic acid (DBSA) | 1 |
| D-limonene | 1 |

Formulation 4.

| Compound | Amount (g) |
|---|---|
| Corn oil methyl ester | 97.9999 |
| Dodecilbenzenesulfonic acid (DBSA) | 1 |
| D-limonene | 1 |
| $\beta$-$Bi_2O_3$ | 0.0001 |

Figure 2:
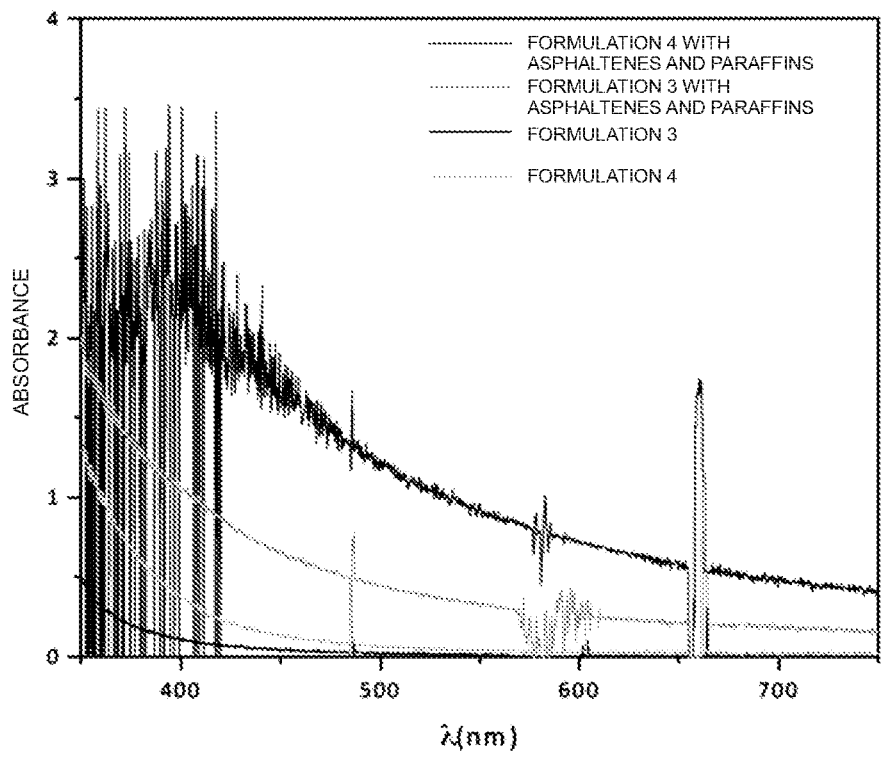
FIG. 2 is a comparative UV-VIS spectrum between a composition comprising bismuth nanoparticles according to an embodiment of the present invention and another composition lacking said nanoparticles.

FIG. 2 shows a comparison between the absorbances of Formulation 3 and Formulation 4 before and after the dispersion test of asphaltenes and paraffins in a wavelength range ($\lambda$) from 350 to 750 nm. It is noted that at a wavelength of 400 nm there is an increase in absorbance for Formulation 4 with respect to its baseline and with respect to Formulation 3, which indicates the increase in the asphaltenes and paraffins concentration due to the dispersion thereof caused by the presence of $\beta$-$Bi_2O_3$ nanoparticles according to the principles of the present invention.

EXAMPLE 5

Absorbance Comparison in Corn Oil Methyl Ester-Based Compositions with Triethanolamine Dodecilbenzenesulfonate and D-Limonene In this example, the same methodologies of Examples 3 and 4 are used in order to compare the asphaltenes and paraffins dispersion caused by the compositions without β-$Bi_2O_3$ nanoparticles (Formula 5) and with β-$Bi_2O_3$ nanoparticles (Formula 6).

Formulation 5.

| Compound | Amount (g) |
| --- | --- |
| Corn oil methyl ester | 98 |
| Triethanolamine dodecilbenzenensulfonate | 1 |
| D-limonene | 1 |

Formulation 6.

| Compound | Amount (g) |
| --- | --- |
| Corn oil methyl ester | 97.9999 |
| Triethanolamine dodecilbenzenensulfonate | 1 |
| D-limonene | 1 |
| β-Bi2O3 | 0.0001 |

Figure 3:
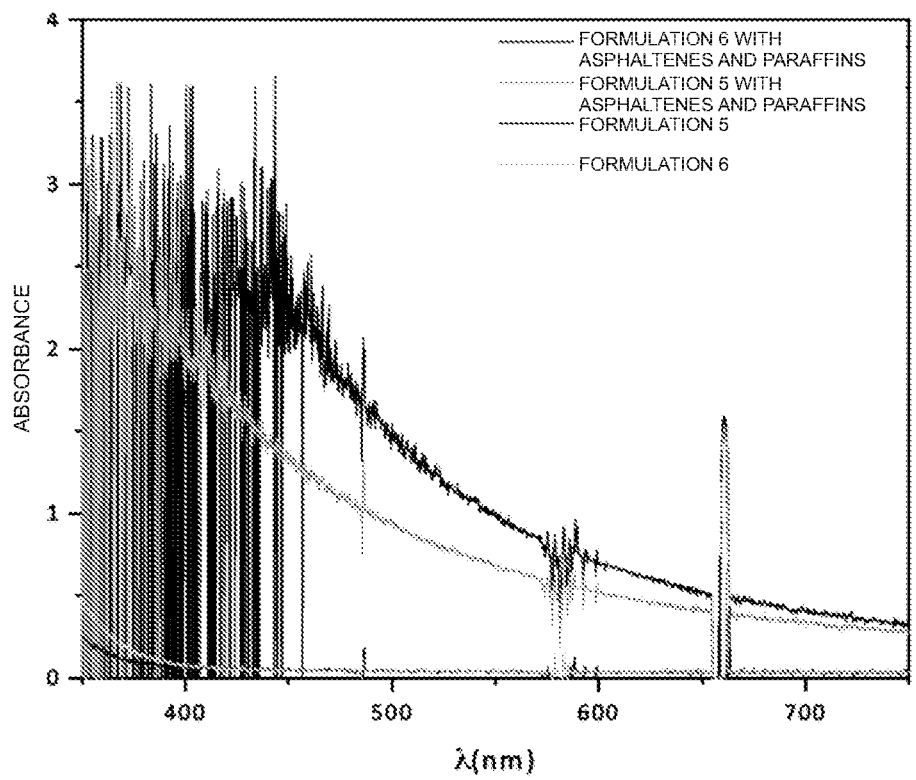
FIG. 3 is a comparative UV-VIS spectrum between a composition comprising bismuth nanoparticles according to an embodiment of the present invention and another composition lacking said nanoparticles.

FIG. 3 shows a comparison between the absorbances of Formulation 5 and Formulation 6 before and after the dispersion test of asphaltenes and paraffins in a wavelength range (λ) from 350 to 750 nm. It is noted that at a wavelength of 400 nm there is an increase in absorbance for Formulation 6 with respect to its baseline and with respect to Formulation 5, which indicates the increase of the asphaltenes and paraffins concentration due to the dispersion thereof caused by the presence of β-$Bi_2O_3$ nanoparticles according to the principles of the present invention.

EXAMPLE 6

Asphaltenes and Paraffins Dispersion Comparison with Commercial Compositions

The present assay has the object of carrying out the comparison of asphaltenes and paraffins dispersion between two commercial compositions, as original and as modified according to the principles of the present invention.

The N-Spec 50 product from the Brenntag company was modified by the addition of β-$Bi_2O_3$ nanoparticles (methodology of Example 1) according to the principles of the present invention. The N-Spec 50 modified composition was named Formulation 7. Then the asphaltenes and paraffins dispersion measurement was carried out for both compositions, the N-Spec 50 original and the N-Spec 50 modified with β-$Bi_2O_3$ nanoparticles (Formulation 7), using the methodology described in Example 2.

Formulation 7. N-Spec 50 Modified with β-$Bi_2O_3$ Nanoparticles.

| Compound | Amount (g) |
| --- | --- |
| N-Spec 50 | 99.9999 |
| β-Bi2O3 | 0.0001 |

Figure 4:
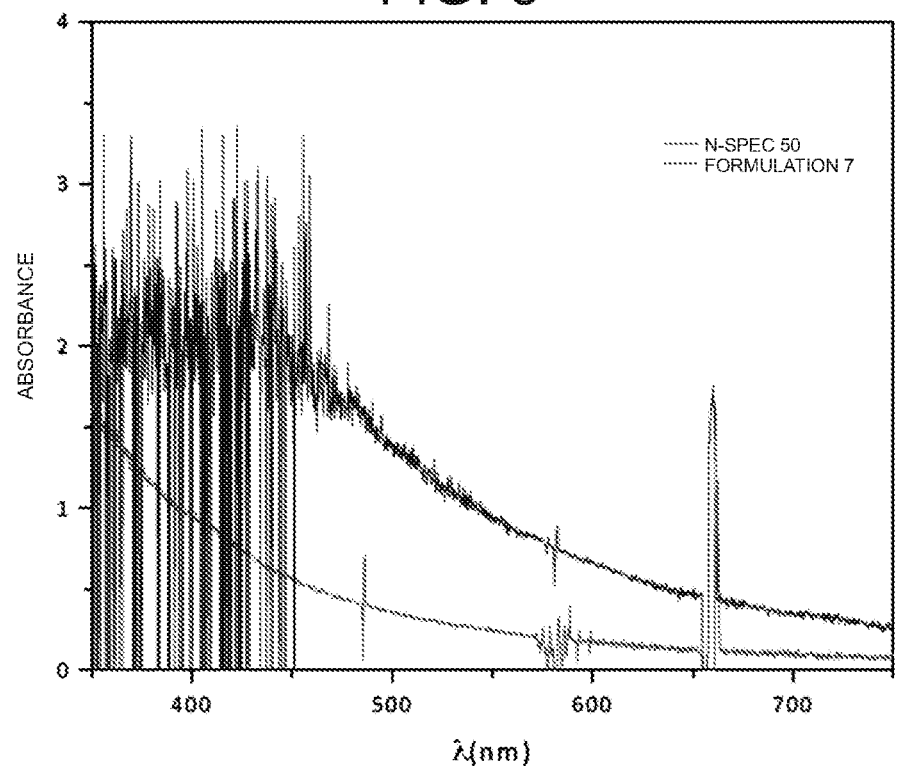
FIG. 4 is a comparative UV-VIS spectrum between a commercial product comprising bismuth nanoparticles according to an embodiment of the present invention and the same commercial product lacking said nanoparticles.

FIG. 4 shows a comparison between the absorbances of Formulation 7 and the N-Spec 50 product in a wavelength range (λ) from 350 to 750 nm. It can be noted that Formulation 7 presents absorbance values at 400 nm greater than those of the N-Spec 50 product. Again it it demonstrated that the presence of β-$Bi_2O_3$ nanoparticles according to the principles of the present invention is responsible for a greater dispersion of asphaltenes and paraffins.

On the other hand, the product Prifer 6813 of the CRODA company was modified by the addition of β-$Bi_2O_3$ nanoparticles (methodology from Example 1) according to the principles of the present invention. The Prifer 6813 modified composition was named Formulation 8. Then the asphaltenes and paraffins dispersion measurement was carried out for both compositions, the original Prifer 6813 and the Prifer 6813 modified with β-$Bi_2O_3$ nanoparticles (Formulation 8) using the methodology described in Example 2.

Formulation 8. Prifer 6813 Added with β-$Bi_2O_3$ Nanoparticles.

| Compound | Amount (g) |
| --- | --- |
| Prifer 6813 | 99.9999 |
| β-$Bi_2O_3$ | 0.0001 |

Figure 5:
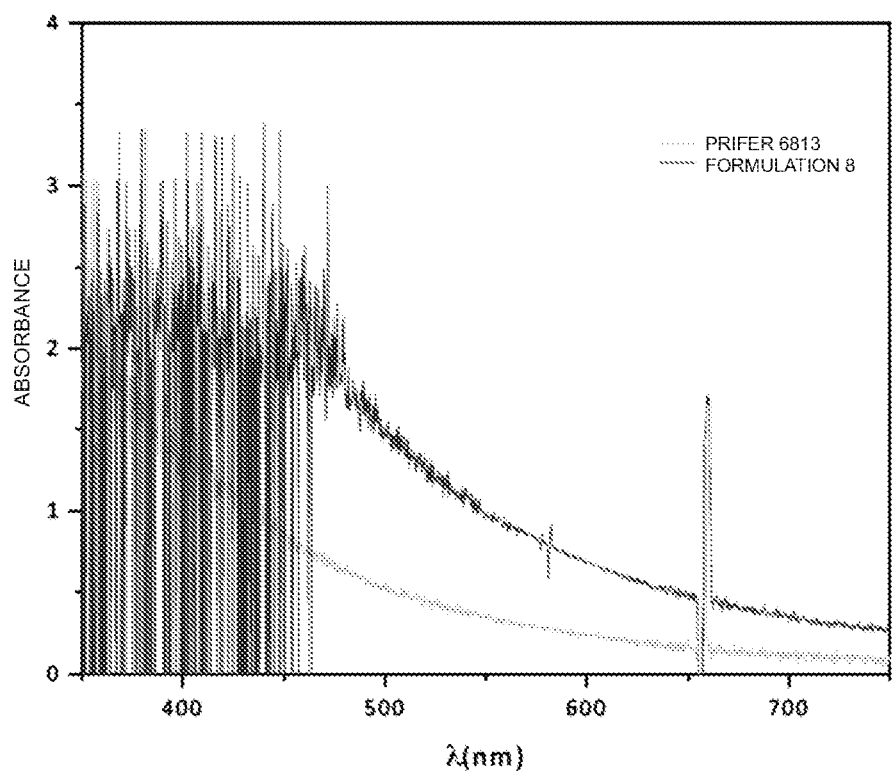
FIG. 5 is a comparative UV-VIS spectrum between another commercial product comprising bismuth nanoparticles according to an embodiment of the present invention and the same commercial product lacking said nanoparticles.

FIG. 5 shows a comparison between the absorbances of Formulation 8 and the Prifer 6813 product in a wavelength range (λ) from 350 to 750 nm. It can be noted that Formulation 8 has absorbance values at 400 nm greater than those of the Prifer 6813 product. Again, it is demonstrated that the presence of β-$Bi_2O_3$ nanoparticles according to the principles of the present invention is responsible for a greater dispersion of asphaltenes and paraffins.

EXAMPLE 7

Asphaltenes and Paraffins Dispersion in Compositions with Different Nanoparticles The same nanoparticles dispersion procedure was carried out according to Example 1 to prepare different compositions (Formulations 9 to 12) using different metal oxide nanoparticles such as $TiO_2$, ZnO, γ-$Fe_2O_3$, $Fe_3O_4$ with the purpose of comparing the effect on the asphaltenes and paraffins dispersion caused by these different nanoparticles with the bismuth nanoparticles according to the principles of the present invention.

Formulations 9 to 12 are the following:

Formulation 9.

| Compound | Amount (g) |
| --- | --- |
| Corn oil methyl ester | 99.9999 |
| TiO2 Evonik Aeroxide P25 | 0.0001 |

Formulation 10.

| Compound | Amount (g) |
| --- | --- |
| Corn oil methyl ester | 99.9999 |
| ZnO Zinacron 40 Nanocron | 0.0001 |

Formulation 11.

| Compound | Amount (g) |
|---|---|
| Corn oil methyl ester | 99.9999 |
| γ-$Fe_2O_3$ Inframat | 0.0001 |

Formulation 12.

| Compound | Amount (g) |
|---|---|
| Corn oil methyl ester | 99.9999 |
| ZnO Inframat | 0.0001 |

Each Formulation 9 to 12 was subjected to the dispersion measurement methodology described in example 2 to determine the efficacy in asphaltenes and paraffins dispersion of each composition. In this case, steps 13 to 15 were carried out to obtain clearer absorbance readings. The absorbance results obtained at a wavelength (λ) of 400 nm were compared with the results obtained for Formulation 2 described in example 3, which contains β-$Bi_2O_3$ nanoparticles according to the principles of the present invention. The comparison of the results is shown in Table 1.

TABLE 1

Absorbance of compositions having nanoparticles from different metal oxides.

| Formulation | wavelength (λ) | Result |
|---|---|---|
| Formulation 2 | 400 | 0.431 |
| Formulation 9 | 400 | 0.335 |
| Formulation 10 | 400 | 0.267 |
| Formulation 11 | 400 | 0.213 |
| Formulation 12 | 400 | 0.163 |

Table 1 shows that although all compositions showed asphaltenes and paraffins dispersion properties, the best absorbance results (0.431) were obtained for Formulation 2 having β-$Bi_2O_3$ nanoparticles.

Figure 6:
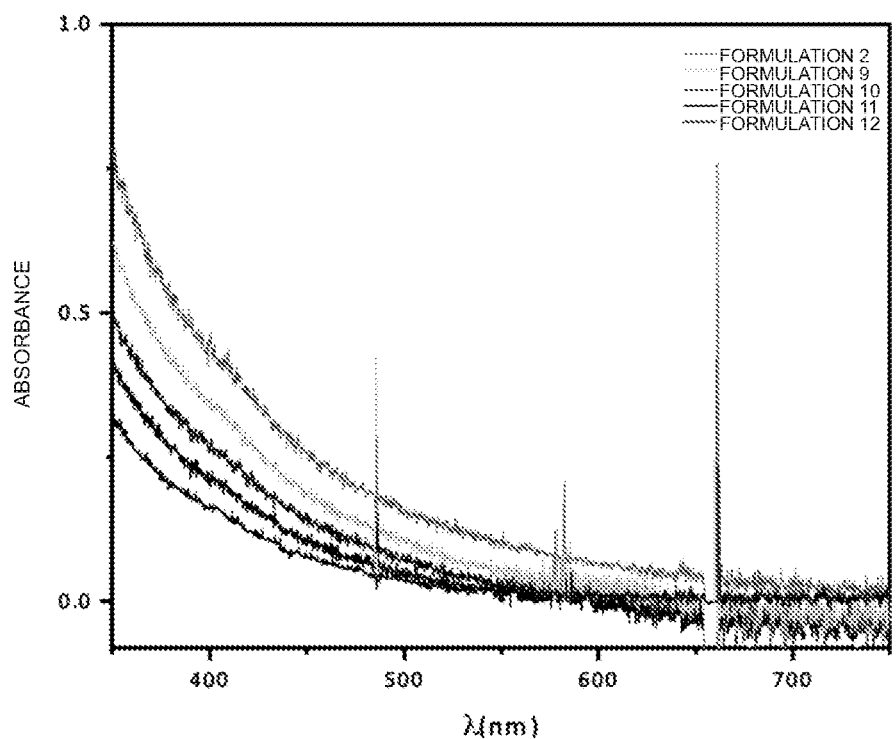
FIG. 6 is a comparative UV-VIS spectrum among compositions comprising different metal oxide nanoparticles.

Likewise, according to the results obtained in FIG. 6, it was determined that the bismuth oxide nanoparticles ($Bi_2O_3$), in their β-$Bi_2O_3$ phase, have greater dispersive efficacy of asphaltenes and paraffins compared with other oxides such as $TiO_2$, γ-$Fe_2O_3$, $Fe_3O_4$, ZnO.

According to that described above, it will be evident that the oil based compositions for dispersing asphaltenes and paraffins have been devised to improve the yield of an oil well by avoiding piping clogging, in such a way that results safer and more environmentally friendly, and it will be evident for any person skilled in the art that the embodiments of the oil based compositions for dispersing asphaltenes and paraffins as described above, are illustrative only and not limitative of the present invention, as numerous considerable changes in its details are possible without departing from the scope of the invention.

Therefore, the present invention should not be considered as restricted except for what the prior art demands and the scope of the appended claims.

The invention claimed is:

1. An oil based composition, comprising from 0.01 to 1.0 wt % of bismuth nanoparticles; from 90 to 99 wt % of a fatty acid methyl ester non-polar solvent; and an organic acid.

2. The composition according to claim 1, further comprising a compound in the terpenes or terpenoids family.

3. The composition according to claim 1, comprising from 95 to 99 wt % of the fatty acid methyl ester.

4. The composition according to claim 2, wherein the composition comprises from 0.5 to 50 wt % of the compound in the terpenes or terpenoids family, and from 0.5 to 20 wt % of the organic acid.

5. The composition according to claim 4, wherein the composition comprises from 0.5 to 10 wt % of the compound in the terpenes or terpenoids family, and from 0.5 to 10 wt % of the organic acid.

6. The composition according to claim 5, wherein the composition comprises from 0.5 to 5 wt % of the compound in the terpenes or terpenoids family, and from 0.5 to 5 wt % of the organic acid.

7. The composition according to claim 1, wherein the fatty acid methyl ester is selected from the group consisting of corn oil methyl ester, rapeseed oil methyl ester, oleic acid methyl ester, fatty-acids medium and large size chain-triglyceride methyl esters, and mixtures thereof.

8. The composition according to claim 7, wherein the fatty acid methyl ester is corn oil methyl ester.

9. The composition according to claim 1, wherein the bismuth nanoparticles are selected from the group consisting of nanodust, nanowire, nanolines, nanotubes, and any bismuth nanostructure.

10. The composition according to claim 1, wherein the bismuth nanoparticles are selected from the group consisting of metal bismuth, bismuth oxide, bismuth sulphide, bismuth carbonate, and mixtures thereof.

11. The composition according to claim 1, wherein the bismuth nanoparticles have a particle size between 5 nm and 200 nm.

12. The composition according to claim 11, wherein the bismuth nanoparticles have a particle size between 20 nm and 100 nm.

13. The composition according to claim 1, wherein the bismuth nanoparticles are modified on their surface or functionalized with functional groups comprising saturated or unsaturated lineal, branched, cyclic C1-C20 carboxylic acids, amides, amines, triglycerides, polymers, aldehydes, ketones; anionic, cationic, zwitterionic and non-ionic surfactants, mercapto groups, thiols, ethers, terpenes, terpenoids, essential oils, saturated or unsaturated straight, branched and cyclic sulfonated acids, salts thereof, or combinations thereof.

14. The composition according to claim 2, wherein the composition comprises the compound in the terpene or terpenoid family selected from the group consisting of monoterpenes, sesquiterpenes, diterpenes, triterpenes, tetraterpenes, polyterpenes, and mixtures thereof.

15. The composition according to claim 14, wherein the composition comprises the compound in the terpene or terpenoid family selected from the group consisting of menthol, pinene, camphor, geraniol, D-limonene, L-limonene, dipentene, myrcene, terpinene, squalene, carotene, orange terpenes, cinnamic aldehyde and long chain aldehydes, and mixtures thereof.

16. The composition according to claim 15, wherein the composition comprises the compound in the terpene or terpenoid family is selected from the group consisting of D-limonene, orange terpenes, cinnamic aldehyde, long chains aldehydes, and mixtures thereof.

17. The composition according to claim 2, wherein the organic acid is selected from the group consisting of sulfonic acids, carboxylic acids, sulfonated acids, salts thereof, and mixtures thereof.

18. The composition according to claim 17, wherein the organic acid is selected from the group consisting of dodecilbenzenesulfonic acid, $C_6$-$C_{18}$ sulfonated acids, and mixtures thereof.

19. The composition according to claim 18, wherein the organic acid is dodecilbenzenesulfonic acid.

20. The composition according to claim 1, further comprising surfactants selected from the group consisting of non-ionic surfactants, anionic surfactants, cationic surfactants, amphoteric surfactants, and mixtures thereof.

21. The composition according to claim 20, further wherein the non-ionic surfactants are selected from the group consisting of alkyl polyglicosides, sorbitan esters, methyl glucoside esters, ethoxylated amines, ethoxylated diamines, polyglicerol esters, polysorbates, alkyl ethoxylates, and mixtures thereof.

22. The composition according to claim 20, wherein the anionic surfactants are selected from the group consisting of alkyl ether sulfonates, docusates, alkyl benzene sulfonates, alkyl sulfonates, alkyl aryl sulfonates, straight or branched alkyl ether sulfates, straight or branched alkyl ether sulfonates, polypropoxylated alcohol sulfates, alkyl bisulfonates, alkyl bisulfates, and mixtures thereof.

23. The composition according to claim 20, wherein the cationic surfactants are selected from the group consisting of methyl arginine esters, alkanolamines, alkylenediamides, alkyl trimethyl ammonium salts, and mixtures thereof.

24. The composition according to claim 21, wherein the non-ionic surfactant is a polysorbate.

25. The composition according to claim 1, wherein the composition is formulated as an oil/water or water/oil emulsion.

26. The composition according to claim 24, wherein the non-ionic surfactant is polyoxyethylene (20) sorbitanmonooleate.

* * * * *